United States Patent [19]

Hensler et al.

[11] Patent Number: 4,656,019
[45] Date of Patent: Apr. 7, 1987

[54] PRODUCTION OF PHASE II SODIUM TRIPOLYPHOSPHATE

[75] Inventors: Paul L. Hensler, Lawrence, Kans.; Frederick J. Kelso; Gary E. Wolfe, both of Trenton, N.J.; Peter H. Zeh, Fremont, Calif.

[73] Assignee: FMC Corporation, Philadelphia, Pa.

[21] Appl. No.: 791,253

[22] Filed: Oct. 25, 1985

[51] Int. Cl.$^4$ .................. C01B 15/16; C01B 25/26
[52] U.S. Cl. .................................. 423/315; 423/305
[58] Field of Search ................ 423/315, 305, 321 R

[56] References Cited

U.S. PATENT DOCUMENTS

| | | | |
|---|---|---|---|
| 3,437,433 | 4/1969 | Sproul et al. | 423/315 |
| 4,391,783 | 7/1983 | Haas et al. | 423/315 |
| 4,534,946 | 8/1985 | Damman et al. | 423/315 |

*Primary Examiner*—Gregory A. Heller
*Attorney, Agent, or Firm*—Patrick C. Baker; Frank Ianno

[57] ABSTRACT

The concentration of Phase II sodium tripolyphosphate in the sodium tripolyphosphate produced by spray drying a feed liquor comprising sodium orthophosphate, sodium pyrophosphate or mixture thereof, is increased to at least 90% by weight of sodium tripolyphosphate product, by seeding the feed liquor with Phase II material. Phase II yield is further increased by introducing with the feed liquor, in addition to the Phase II seed material, a minor amount of sodium sulfate. Hydrolysis of the Phase II seed is minimized by concentrating the Phase II seed in feed liquor in a separate feed tank at a lower temperature than the main feed line. Dispersing the Phase II seed in water, a dilute soda ash solution or an inert organic liquid and then injecting the dispersion into the feed liquor into the spray dryer promotes good contact between the seed and feed.

12 Claims, No Drawings

PRODUCTION OF PHASE II SODIUM TRIPOLYPHOSPHATE

BACKGROUND OF THE INVENTION

This invention relates to a spray drying process for the production of Phase II sodium tripolyphosphate.

Sodium tripolyphosphate ("STPP") exists in two major crystalline forms, known as Phase I (or Form I) and Phase II (or Form II). Each form, and more usually mixtures of the forms, can be prepared by heating (calcining) essentially dry phosphates other than tripolyphosphates, or by spray drying an orthophosphate or pyrophosphate liquor. More Phase I material is formed if the process temperature is maintained above 450° C. More Phase II material is formed at temperatures below 450° C. The transition temperature between the two forms is about 420° C. The two crystalline forms have different properties and industrial detergents and cleansers are often formulated around these properties. In many applications, the two forms are not interchangeable.

Spray drying is the preferred process for producing STPP because it is fast and can be operated as a single step and on a large scale. The alternative process, calcining of essentially dry feed material in rotary calciners, can be used to produce high purity (at least 90% by weight) of either form but the process takes hours as compared with minutes and even seconds in the spray drying process. Spray drying has been readily adapted to production of high purity Phase I material but until the present invention, attempts to adapt existing one-step spray drying processes and equipment to production of Phase II material have not been successful. Thus, U.S. Pat. No. 3,438,725 discloses a one-step spray drying process for producing substantially pure Phase II STPP. However, the process depends on use of wet process acid and careful control of the amounts of sulfate and metallic impurities. Other spray drying processes have resulted in heavy caking on the walls of the dryer due, in part, to the lower temperatures required for Phase II STPP production.

Calcining processes provide no effective guidance to production of high purity (at least 90%) Phase II STPP by spray drying. For example, U.S. Pat. No. 2,920,939 describes a process for calcining essentially dry phosphate mixtures of tripolyphosphates substantially free of impurities with accelerated rates of conversion by adding at least 1% by weight of crystalline alkali metal tripolyphosphate to the phosphate mixture. The patent states that STPP, and Phase II material in particular, can be produced practically completely free from impurities by incorporating into the reaction mixture an amount of crystalline Phase II material which is several times as much (for example, 8 or 10 times) as nontripolyphosphate reactants in the mixture. The patent also demonstrates that the incorporation of smaller amounts (e.g., 5 wt. %) of Phase I material or STPP hexahydrate is far more effective than the incorporation of the same amounts of Phase II material for improving the production of Phase II STPP. However, even the preferred practice gives only about 82% conversion to Phase II product.

SUMMARY OF THE INVENTION

It has now been found, in one aspect of the invention, that high purity (at least 90 wt. %, preferably 92 wt. % or more) Phase II STPP can be produced, in an otherwise conventional one-step spray drying process, by seeding the feed liquor to the spray dryer with a minor amount of Phase II STPP.

In another aspect of the invention, the hydrolysis of the Phase II seed material, which interferes with the efficiency of the process, optionally can be minimized or substantially reduced by incorporating into the feed liquor with the Phase II seed material a minor amount of salt cake (sodium sulfate).

In still another aspect of the invention, it has been found that the hydrolysis of Phase II seed optionally may be further reduced by introducing the seed material into a portion of feed liquor, separate from the main feed liquor line to the spray dryer, at a reduced temperature. Preferably, this separate mixture is injected into the main stream of the feed liquor at a point immediately prior to exiting of the feed liquor from the spray nozzles into the spray dryer.

In yet another aspect, good contact between the seed material and the feed liquor is promoted by admixing the seed with an inert organic liquid, either prior to or simultaneously with introduction of the feed liquor into a spray dryer.

By virtue of these improvements, utilized singly but preferably in combination, the commercial production of Phase II STPP by spray drying may be controlled to produce high purity Phase II material, along with all the other economies, advantages and efficiencies of speed and scale afforded by one-step spray drying.

DETAILED DESCRIPTION

The spray drying process, improved in accordance with the present invention, is a one-step process such as described in U.S. Pat. No. 3,661,514, as opposed to multi-step processes, such as calcining combined with spray drying. Typically, in a one-step process, such as described in U.S. Pat. No. 3,661,514, the spray dryer is a large, cylindrical vessel having a plurality of nozzles near the bottom for injecting feed liquor with steam under atomizing conditions, and having a plurality of burners or hot gas jets at the top for drying the sprayed material. The feed liquor is supplied from a feed tank backed up by several adjustment tanks for make up of batches of feed liquor. Spray dryer temperature is monitored by off-gas temperature at the off-gas port normally located near the bottom of the spray vessel. The major portion of product is taken off at the bottom of the vessel and remaining product leaves with the off-gases for recovery in cyclone separators.

The feed liquor is any sodium orthophosphate, sodium pyrophosphate, mixture thereof, or other phosphate composition from thermal or wet process acids (described in U.S. Pat. No. 3,438,725 and other publications). If the source is wet process acid, the feed will contain a small amount of salt cake (sodium sulfate) which, as explained in more detail below, is advantageous. A feed liquor substantially saturated in orthophosphate and/or pyrophosphate is preferred for better process economy (less water means less energy is required to remove the water) but the invention is operative with dilute feed liquors as well.

In the improved spray drying process of the invention, the feed liquor to the spray dryer is seeded with crystalline Phase II STPP, preferably as a powder. About 1% to 15% by weight of Phase II material, preferably about 2% to 8%, calculated as $P_3O_{10}^{-5}$ present as $P_2O_5$ in the feed liquor, is optimum but other amounts may be used. The seeded liquor is then spray dried in a conventional spray dryer, such as described in U.S. Pat. No. 3,661,514, at temperatures favoring the formation of stable Phase II STPP, i.e., below 450° C., preferably below 420° C., such as about 250° to 420° C. Product is formed in less than about 10 seconds, more usually in about 3-5 seconds.

Residence time of the Phase II seed in the feed liquor should be as short as possible because the high temperature of feed liquors usually encountered in the plant, e.g., over 100° C., promotes hydrolysis of the Phase II seed to orthophosphate. Accordingly, the residence time should not be more than about 10 to 20 minutes, preferably about 1 to 15 minutes, and the feed liquor temperature reduced to about 75° C. to 100° C., preferably about 90° C. to 98° C. Optionally, the hydrolysis effect of temperature can also be lessened by increasing the concentration of Phase II seed in the feed liquor. This is achieved by taking off a portion of the feed liquor to a separate mixing tank and introducing amounts of Phase II seed such that when the mixture is injected into the main feed liquor and the seed concentration thereby diluted, the requisite seed concentration will be present. In this modification, the more concentrated (in Phase II seed), separately prepared feed liquor preferably will be injected into the main feed liquor at a point proximate to the spray nozzles of the spray dryer, and as close as possible to the point of exiting of the feed liquor from the spray nozzles, in order to reduce the residence time of the seed material in the feed liquor.

However, other conditions must be balanced with temperature and concentration of Phase II seed in the feed liquor. These are viscosity, surface tension and feed rate of the feed liquor. Too great a reduction of feed liquor temperature will increase the viscosity and surface tension of the feed liquor, in turn adversely affecting the spray droplet pattern formed at the spray nozzles. Too high a feed rate may lead to caking on the walls of the spray dryer. Accordingly, a preferred combination of feed liquor conditions is a feed liquor temperature of about 91° C. to 97° C., an average retention time of seed material in the feed of about 13 to 17 minutes, and a feed rate of about 40 to 60 gallons per minute, preferably about 50 gallons per minute. Other ranges and combinations of conditions can, of course, be determined in routine fashion by the skilled practitioner for various spray dryers and process designs.

As indicated, the presence of salt cake in the feed liquor or introduction of salt cake into the feed liquor, in addition to Phase II seed material, further increases the concentration of Phase II in the spray dryed STPP product. A small amount of sodium sulfate is effective, of the order of about 1 to 4% by weight, preferably about 2% by weight, based on total $P_2O_5$ in the feed liquor. Greater amounts of salt cake can be used but this may result in off-specification Phase II product. The salt cake may be added to the main feed liquor stream or to the mixing tank adapted for separate mixing of feed liquor and Phase II seed. In the latter case, the amount added to the feed liquor in the separate tank will be sufficiently high so that upon introduction of the separate mixture into the main feed liquor, the requisite concentration will be present. While not fully understood, it is believed that salt cake increases the yield of Phase II material by suppressing hydrolysis of Phase II seed in the hot feed liquor.

Various modifications of the process will be apparent from the foregoing description. For example, in place of forming a separate feed liquor more highly concentrated in Phase II seed, for introduction into the main feed liquor, a slurry of Phase II seed, either aqueous or as a dilute soda ash solution, may be prepared at the lower temperature (less than 100° C.) and injected into the main feed liquor line just before the spray nozzles. The lower Phase II material hydrolysis achieved by this technique will also permit a lower concentration of Phase II seed in the feed liquor. For example, a seed concentration of about 2.0 to 2.5% by weight, calculated as $P_3O_{10}^{-5}$ present as $P_2O_5$ in the feed liquor, would be expected to be as effective as a 5% by weight Phase II seed concentration.

Optionally also, a non-aqueous carrier for the Phase II seed may be used to promote good contact between the seed material and the feed liquor. For example, the STPP seed may be dispersed or slurried in an inert organic liquor, which will readily evaporate in the spray dryer, and the dispersion or slurry injected into the feed liquor, preferably at the spray nozzles, less preferably into the main feed liquor line or into the separate mixing tank, described above, for concentrating seed material in the feed liquor. The seed material may be admixed with the organic liquid prior to or simultaneously with introduction of the feed liquor into the spray dryer. Suitable carrier liquids are compounds which are chemically inert to the feed liquor and STPP seed, and include alcohols, such as methanol, ethanol or propanol; glycols such as ethylene glycol and diethylene glycol; polyhydric alcohols such as glycerol; glycol ethers such as ethylene glycol dimethyl- and diethyl ether; and any mixtures of any of the foregoing. From about 10% by weight to 90% by weight of seed material in the inert liquid carrier may be employed, the optimum amounts being dependent on the particular carrier and mode of addition of the dispersion or slurry to the feed liquor. For example, slurries more dilute in seed material may be preferred for injection into the feed liquor at the nozzles.

The following example further illustrates the process.

EXAMPLE

A series of test runs were made on a commercial spray dryer fired by natural gas. Feed liquor is introduced through spray nozzles and atomized with steam. The bottom product outlet is equipped with screw conveyors to remove the calcined STPP. The off-gas stream passes through cyclones to remove entrained STPP solids which are combined with the bottom discharge material. The combined solids are cooled and screened to give the desired mesh sizing. Typical operating ranges for the spray dryer are:

| | |
|---|---|
| Feed rate, gal./min. (gpm) | 40-60 |
| Phase II STPP seed rate, lb./hr. | 1000 |
| Feed liquor Baume, °Be | 54.5-55.5 |
| Feed liquor temp., °C. | 100-110 |
| Atomizing steam rate, lbs./hr. | 1600-2000 |
| Exit gas temp., °C. | 300-340 |

The test runs were made for 4-22 hours under conditions and with results that were averaged and compared with normal production without the Phase II STPP seed and with and without sodium sulfate. In these runs and except as noted, the $Na_2O/P_2O_5$ ratio was about 1.670/1, the feed rate was 46 gal./min. at a feed temperature of 104.5° C., the atomizing steam rate was 1800 lbs/hr, and the feed solution was 55° Baume orthophosphate. The results are given in Table I from which will be apparent the substantial improvement in Phase II STPP content of the STPP product afforded by the seeding with Phase II STPP and sodium sulfate addition as compared with production from regular dryer operations.

TABLE I

| Run Series | Time (hours) | Dryer Off-Gas, °C. | Phase II[1] STPP Seed, % | $Na_2SO_4$ %[2] | Phase I % | Phase II[3] % |
|---|---|---|---|---|---|---|
| I (A) | 6 | 300 | 1.56 | 0 | 9 | 91 |
| (B) | 11 | 300 | 1.71 | 2 | 3 | 97 |
| Regular Dryer Operation | | 300 | 0 | 0 | 20–24 | 80–76 |
| II (A) | 6 | 330 | 1.56 | 2 | 3 | 97 |
| (B) | 3 | 330 | 1.71 | 0 | 13 | 87 |
| Regular Dryer Operation | | 330 | 0 | 0 | 28–32 | 72–68 |
| III (A) | 20 | 320 | ca. 1.5–1.7 | 2 | 5 | 95 |
| Regular Dryer Operation | | 320 | 0 | 0 | 24–28 | 76–72 |

[1]Percentage of total $P_2O_5$ in feed liquor present as $P_3O_{10}^{-5}$, adjusted for loss (ca. 50 to 60%) due to hydrolysis.
[2]$Na_2SO_4$ content of final STPP. Substantially same as in feed liquor.
[3]By difference from Phase I analysis, based on assumed 100% STPP product.

We claim:

1. In a method of producing sodium tripolyphosphate wherein an aqueous feed liquor supplied to a spray dryer from a feed tank, comprising sodium orthophosphate, sodium pyrophosphate or a mixture thereof, is spray dried from spray nozzles in the spray dryer at a temperature below 450° C., the improvement which comprises introduction with the feed liquor a minor but effective amount of a crystalline Phase II sodium tripolyphosphate seed, whereby the concentration of Phase II material in the sodium tripolyphosphate product is at least 90% by weight.

2. The method of claim 1 wherein the temperature is about 250° to about 420° C.

3. The method of claim 1 wherein the amount of Phase II seed introduced with the feed liquor is about 1% to 15% by weight, calculated as $P_3O_{10}^{-5}$ present as $P_2O_5$ in the feed liquor.

4. The method of claim 1 wherein the temperature is about 250° C. to about 420° C., and the amount of Phase II seed introduced with the feed liquor is about 1% to 15% by weight, calculated as $P_3O_{10}^{-5}$ present as $P_2O_5$ in the feed liquor.

5. The method of claim 1 wherein a minor but effective amount of sodium sulfate is also introduced with the feed liquor, whereby the concentration of Phase II material in the product is further increased.

6. The method of claim 5 wherein the amount of sodium sulfate is about 1–4% by weight, based on total $P_2O_5$ in the feed liquor.

7. The method of claim 1 wherein the Phase II seed is introduced into a portion of the feed liquor in a vessel separate from the feed tank to the spray dryer, at a temperature lower than the temperature of the main feed line, and the resulting separate mixture of feed liquor and Phase II seed is introduced into the feed liquor at a point proximate to the spray nozzles, whereby hydrolysis of Phase II seed material is reduced and the concentration of Phase II material in the product is increased.

8. The process of claim 7 wherein the temperature of the separate mixture of feed liquor and phase II seed is about 75° C. to about 100° C.

9. The process of claim 7 wherein a minor amount of sodium sulfate is introduced into the feed liquor by addition to the feed tank to the spray dryer, whereby the concentration of Phase II material in the product is further increased.

10. The process of claim 9 wherein the amount of sodium sulfate is about 1–4% by weight, based on total $P_2O_5$ in the feed liquor.

11. The process of claim 1 wherein the phase II seed is admixed with an inert organic liquid prior to or simultaneously with introduction of the feed liquor into the spray dryer, the amount of the liquid being effective to improve contact between the seed and the feed.

12. The process of claim 1 wherein the phase II seed is slurried in water or in a dilute aqueous soda ash solution, and the resulting slurry then injected into the feed liquor at a point prior to exiting of the feed liquor from the spray nozzles.

* * * * *